US012612719B2

(12) United States Patent
Koo et al.

(10) Patent No.: US 12,612,719 B2
(45) Date of Patent: Apr. 28, 2026

(54) PILE KNIT FABRIC FOR INTERIOR MATERIALS OF VEHICLES, METHOD OF MANUFACTURING THE SAME AND MANUFACTURING MACHINE OF PILE KNIT FABRIC

(71) Applicants: Hyundai Motor Company, Seoul (KR); Kia Motors Corporation, Seoul (KR); Kolon Glotech, Inc., Yongin-si (KR)

(72) Inventors: Hong Mo Koo, Hwaseong-si (KR); Mi Jung Yun, Yongin-si (KR); Oh Deok Kwon, Hwaseong-si (KR); Joon Yong Song, Hwaseong-si (KR); Hyun Dae Cho, Seongnam-si (KR); Hong Chan Jeon, Seoul (KR); Hyung Joon Youn, Seoul (KR); Hyun Joung Jun, Gumi-si (KR)

(73) Assignees: Hyundai Motor Company, Seoul (KR); Kia Motors Corporation, Seoul (KR); Kolon Glotech, Inc., Yongin-si (KR)

( * ) Notice: Subject to any disclaimer, the term of this patent is extended or adjusted under 35 U.S.C. 154(b) by 0 days.

(21) Appl. No.: 18/740,890

(22) Filed: Jun. 12, 2024

(65) Prior Publication Data

US 2024/0328042 A1 Oct. 3, 2024

Related U.S. Application Data

(62) Division of application No. 16/667,384, filed on Oct. 29, 2019, now abandoned.

(30) Foreign Application Priority Data

Dec. 31, 2018 (KR) ........................ 10-2018-0173372

(51) Int. Cl.
 *D03D 27/10* (2006.01)
 *B60R 13/02* (2006.01)
 (Continued)

(52) U.S. Cl.
 CPC ............. *D03D 27/10* (2013.01); *B60R 13/02* (2013.01); *D03D 39/24* (2013.01); *D03D 49/00* (2013.01);
 (Continued)

(58) Field of Classification Search
 CPC .. B60R 13/02; D04B 1/04; D04B 1/16; D04B 21/04; D04B 27/00; D04B 35/34;
 (Continued)

(56) References Cited

U.S. PATENT DOCUMENTS

2002/0124365 A1 9/2002 Wood
2008/0044620 A1* 2/2008 Rock ..................... D03D 15/49
 428/95

(Continued)

FOREIGN PATENT DOCUMENTS

JP 2010229569 A 10/2010
KR 2011-0087959 A 8/2011
 (Continued)

*Primary Examiner* — Lynda Salvatore
(74) *Attorney, Agent, or Firm* — MORGAN, LEWIS & BOCKIUS LLP

(57) ABSTRACT

A pile knit fabric for internal materials of vehicles may include a knit layer prepared by weaving ground yarns, on one surface thereof, and a pile layer prepared by interweaving pile yarns with ground yarn loops of the knit layer, on the (Continued)

other surface thereof and, thus, has excellent physical coupling force between the ground yarns and the pile yarns and has excellent abrasion resistance, scratch resistance and formability as well as soft tactility.

3 Claims, 12 Drawing Sheets

(51) Int. Cl.

| | |
|---|---|
| *D03D 39/24* | (2006.01) |
| *D03D 49/00* | (2006.01) |
| *D04B 1/04* | (2006.01) |
| *D04B 1/16* | (2006.01) |
| *D06C 7/00* | (2006.01) |
| *D06C 11/00* | (2006.01) |
| *D06C 13/08* | (2006.01) |

(52) U.S. Cl.
CPC ................ *D04B 1/04* (2013.01); *D04B 1/16* (2013.01); *D06C 7/00* (2013.01); *D06C 11/00* (2013.01); *D06C 13/08* (2013.01); *D06C* *2700/15* (2013.01); *D10B 2331/04* (2013.01); *D10B 2505/12* (2013.01)

(58) Field of Classification Search
CPC ........ D03D 27/10; D03D 39/24; D03D 49/00; D06C 11/00; D06C 13/08; D06C 2700/15; D06C 7/00; D06C 13/10; D06C 27/00; D06C 7/02; D10B 2331/04; D10B 2505/12
See application file for complete search history.

(56) References Cited

U.S. PATENT DOCUMENTS

| | | |
|---|---|---|
| 2014/0134387 A1 | 5/2014 | Yamada |
| 2015/0104604 A1 | 4/2015 | Rock |

FOREIGN PATENT DOCUMENTS

| | | | |
|---|---|---|---|
| KR | 101914695 B | 11/2018 | |
| WO | WO-2004103055 A2 * | 12/2004 | ............ D04B 21/04 |

* cited by examiner

DOUBLE-SIDED LOOP STRUCTURE

SINGLE-SIDED LOOP STRUCTURE

FIG. 6

| Factor | Comparative example 1 | Comparative example 2 | Example 2 |
|---|---|---|---|
| Fabric type | Non-woven fabric | BCF fabric | Pile knitted fabric |
| Shape | | | |
| Appearance | × (density at bent portion) | ○ (exposure of weaving pattern) | ◎ |
| Tactility | 2 | 3 | 4-5 |
| Contamination (solid phase) | × | △ | ◎ |
| Weight per area | 450 g/m² | 400 g/m² | 350 g/m² |

[COMPARATIVE EXAMPLE 1]

[COMPARATIVE EXAMPLE 2]

[EXAMPLE 2]

[COMPARATIVE EXAMPLE 1]

[COMPARATIVE EXAMPLE 2]

[EXAMPLE 2]

PILE KNIT FABRIC FOR INTERIOR MATERIALS OF VEHICLES, METHOD OF MANUFACTURING THE SAME AND MANUFACTURING MACHINE OF PILE KNIT FABRIC

CROSS-REFERENCE TO RELATED APPLICATION

The present application is a divisional of U.S. patent application Ser. No. 16/667,384, filed Oct. 29, 2019, which claims priority to Korean Patent Application No. 10-2018-0173372, filed on Dec. 31, 2018, the entire contents of which is incorporated herein for all purposes by this reference.

BACKGROUND OF THE INVENTION

Field of the Invention

The present invention relates to a pile knit fabric for internal materials of vehicles which has excellent physical coupling force between yarns and has excellent abrasion resistance, scratch resistance and formability as well as soft tactility, a method of manufacturing the same, and a manufacturing machine of the pile knitted fabric.

Description of Related Art

A non-woven fabric or a bulked continuous filament (BCF) fabric is used as a skin material of luggage trim parts mounted to cover a vehicle body, wire harnesses, a spare tire, etc. exposed to the internal to a vehicle trunk and to secure a cargo space. The conventional non-woven fabric is manufactured through physical interlacing of fibers using carding and needle-punching processes and, thus, has low production cost but has insufficient coupling force between the fibers and causes lowering of abrasion and scratch performance (defibration). Furthermore, needle-punched marks are visible on the surface of the fabric and thus marketability of the fabric is lowered, and only short piles of a loop type are made and thus tactility of the fabric is insufficient.

To solve these problems, a BCF fabric, in which yarns are planted in a base fabric to have a length of 3-10 mm and a latex layer or a coating layer is applied to the rear surface of the base fabric to prevent pulling-out of the yarns, is applied. However, such a manufacturing method in which yarns are planted in a base fabric lowers fabric elongation and is thus disadvantageous to forming of a product having a complicated shape. Furthermore, the BCF fabric manufactured through various processes has higher production cost than the conventional non-woven fabric and is thus limitedly used in only floor carpeting in Korea. In addition, there are no cases that the BCF fabric is applied to luggage trim parts, and there are some cases that the BCF fabric is applied to luxury cars only in overseas. Accordingly, research and development of a new material, which is inexpensive, does not restrict the shapes of parts and has excellent abrasion resistance and scratch resistance, has been required.

The information included in this Background of the present invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pile knit fabric for internal materials of vehicles which has excellent physical coupling force between yarns and soft surface tactility.

Various aspects of the present invention are directed to providing a method of manufacturing a pile knit fabric for internal materials of vehicles in which productivity is enhanced and a manufacturing process is shortened.

It is yet another object of the present invention to provide a manufacturing machine of a pile knit fabric for internal materials of vehicles.

Various aspects of the present invention are directed to providing a pile knit fabric for internal materials of vehicles, including a knit layer prepared by weaving a plurality of ground yarns lengthwise and widthwise into loop shapes and a pile layer prepared by interweaving a plurality of pile yarns with ground yarn loops of the knit layer, wherein the knit layer is prepared by weaving the ground yarns to form a double-sided loop structure or a single-sided loop structure, and the pile layer is fixed to one surface of the knit layer and prepared by interlacing the pile yarns with the ground yarn loops of the knit layer.

In an exemplary embodiment of the present invention, the ground yarns or the pile yarns may be formed of one or more selected from the group consisting of polyamide, polypropylene, polyethylene terephthalate (PET) and wool.

In another exemplary embodiment of the present invention, the number of the ground yarn loops of the knit layer may be 250-950 per meter in the horizontal direction thereof.

In yet another exemplary embodiment, the ground yarns may have fineness of 50-200 denier.

In yet another exemplary embodiment, the knit layer may have a thickness of 0.1-2 mm and a weight per area of 40-200 g/m$^2$.

In still yet another exemplary embodiment, one strand of the pile yarns may include 10-140 strands of filaments, and the filaments have fineness of 3-25 denier.

In a further exemplary embodiment, the pile yarns may have a length of 2-10 mm.

In another further exemplary embodiment, the pile layer may have a thickness of 1-9 mm and a weight per area of 100-600 g/m$^2$.

In yet another further exemplary embodiment, the pile knit fabric may have a weight per area of 200-700 g/m$^2$.

Various aspects of the present invention are directed to providing a method of manufacturing a pile knit fabric for internal materials of vehicles, including preparing a plurality of ground yarns and a plurality of pile yarns, weaving the ground yarns into loop shapes to intersect each other lengthwise and widthwise, producing a double woven fabric using a double Raschel method by interweaving the pile yarns with ground yarn loops, producing pile knit fabrics by cutting the pile yarns of the double woven fabric, brushing the cut pile yarns of the pile knit fabrics, and performing heat treatment of the brushed pile knit fabrics.

In an exemplary embodiment of the present invention, in the producing the pile knit fabrics, the pile yarns of the double woven fabric may be cut to have a length of 2-10 mm.

In another exemplary embodiment of the present invention, in the brushing the pile knit fabrics, the cut pile knit fabrics may be brushed by rotating a brush at a rate of 400-800 rpm and a speed of 4-10 m/min In yet another exemplary embodiment, in the performing heat treatment of the pile knit fabrics, the heat treatment may be performed at a temperature of 110-200° C. for 2-10 minutes.

It is another object of the present invention to a manufacturing machine of a pile knit fabric for internal materials of vehicles, including a weaving unit configured to produce a double woven fabric by weaving a plurality of ground yarns into loop shapes to intersect each other lengthwise and widthwise and connecting ground yarn loops by pile yarns through vertical reciprocation, fabric transfer rollers configured to transfer the double woven fabric produced by the weaving unit, a cutting unit configured to produce pile knit fabrics by cutting the pile yarns of the double woven fabric transferred from the fabric transfer rollers, brushing units configured to brush the surfaces of the cut pile yarns of the pile knit fabrics, and a heat treatment unit configured to perform heat treatment of the brushed pile knit fabrics.

In an exemplary embodiment of the present invention, the cutting unit may include knife blades configured to cut the double woven fabric, grinding stones selectively engaged to the knife blades to grind the knife blades, driving pulleys configured to position the knife blades, driving belts coupled to the driving pulleys and configured to rotate the driving pulleys, and a fixing shaft fixed to the knife blades.

In another exemplary embodiment of the present invention, the grinding stones may grind the knife blades at a grinding angle of 45-55°.

In yet another exemplary embodiment, each of the brushing units may include a cylinder and a brush coupled to the cylinder.

Other aspects and exemplary embodiments of the invention are discussed infra.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is results of evaluation for appearances and contamination degrees of the manufactured luggage trims;

Figure 1A:
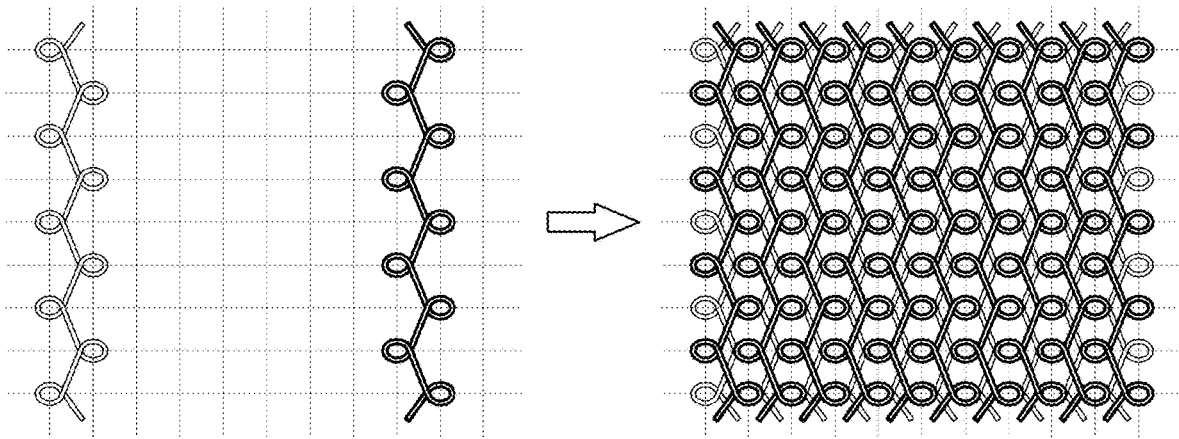
FIG. 1A is a view exemplarily illustrating a knit layer in accordance with various aspects of the present invention, in which ground yarns are woven to form a double-sided loop structure.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the contrary, the present invention is intended to cover not only the exemplary embodiments of the present invention, but also various alternatives, modifications, equivalents and other embodiments within the spirit and scope of the present invention as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the present invention. Singular expressions may encompass plural expressions, unless they have clearly different contextual meanings.

In the following description of the embodiments, terms, such as "comprising", "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing components, reaction conditions, polymer compositions and amounts of blends used in the description are approximations in which various uncertainties in measurement generated when these values are acquired from essentially different things are reflected and thus, it will be understood that they are modified by the term "about", unless stated otherwise. In addition, it will be understood that, if a numerical range is included in the description, such a range includes all continuous values from a minimum value to a maximum value of the range, unless stated otherwise. Furthermore, if such a range refers to integers, the range includes all integers from a minimum integer to a maximum integer of the range, unless stated otherwise.

In the following description of the embodiments, it will be understood that, when a range of variables is stated, the variables include all values within the stated range including stated end points of the range. For example, it will be understood that a range of "5 to 10" not only includes values of 5, 6, 7, 8, 9 and 10 but also includes arbitrary subranges, such as a subrange of 6 to 10, a subrange of 7 to 10, a subrange of 6 to 9, a subrange of 7 to 9, etc. and arbitrary values between integers which are valid within the scope of the stated range, such as 5.5, 6.5, 7.5, 5.5 to 8.5, 6.5 to 9, etc. Furthermore, for example, it will be understood that a range of "10% to 30%" not only includes all integers including values of 10%, 11%, 12%, 13%, . . . 30% but also includes arbitrary subranges, such as a subrange of 10% to 15%, a subrange of 12% to 18%, a subrange of 20% to 30%, etc., and arbitrary values between integers which are valid within the scope of the stated range, such as 10.5%, 15.5%, 25.5%, etc.

In general, a non-woven fabric is manufactured by measuring PET fibers or PA fibers and forming physical interlacing through carding, stacking and needle-punching processes. As described above, the non-woven fabric has a higher production speed than other fabrics and may thus have low production cost, and is manufactured through physical interlacing of fibers and may thus have excellent bidirectional elongation and implement various shapes during forming of a product. However, the conventional non-woven fabric has insufficient coupling force between the fibers due to physical interlacing and may thus be weak to abrasion or scratch, and cause dust due to generation of a large number of short fibers during the needle-punching process. Furthermore, needle-punched marks remain on the surface of the fabric and are thus transferred to the product.

In contrast, a BCF fabric is manufactured by planting yarns in a base fabric and coating the rear surface of the base fabric with latex and has excellent abrasion and scratch performance because the yarns planted in the base fabric are attached to latex. Furthermore, the yarns are oriented in a vertical direction based on the base fabric and thus, the BCF fabric has an excellent texture. However, since the yarns are planted in the base fabric and the rear surface of the base fabric is coated with latex, the BCF fabric has poor elongation during forming of a product and thus limits the shape of the product. Furthermore, the BCF fabric is manufactured through a complicated manufacturing process and thus has high production cost and is limitedly applied only to carpeting.

To solve these problems, in an exemplary embodiment of the present invention, a pile knit fabric, including a knit layer prepared by weaving ground yarns and a pile layer prepared by interweaving pile yarns with ground yarn loops of the knit layer, is manufactured, and thus excellent physical coupling force between the ground yarns may be acquired and tactility may be enhanced due to excellent fiber orientation of the pile yarns. Furthermore, the pile knit fabric has excellent abrasion resistance and scratch resistance and has excellent formability and may thus implement various shapes during forming of a product. In addition, since two pile knit fabrics are manufactured by cutting the centers of pile yarns of a double woven fabric, productivity may be improved and a manufacturing process may be shortened because separate latex treatment on the rear surface of the fabric, which was conducted on the conventional BCF or non-woven fabric, is not necessary.

In addition, in a manufacturing machine of a pile knit fabric, including a grinding unit to grind a knife blade at a designated angle, the knife blade may be ground simultaneously with cutting of pile yarns. Furthermore, the angle of grinding stones may be adjusted according to fineness of the pile yarns, thus grinding the knife blade sharply.

Hereinafter, a pile knit fabric for internal materials of vehicles, a method of manufacturing the same, and a manufacturing machine of the pile knit fabric in accordance with various aspects of the present invention will be described in detail with reference to the accompanying drawings Various aspects of the present invention are directed to providing a pile knit fabric for internal materials of vehicles, including a knit layer prepared by weaving a plurality of ground yarns lengthwise and widthwise into loop shapes and a pile layer prepared by interweaving a plurality of pile yarns with ground yarn loops of the knit layer, the knit layer being prepared by weaving the ground yarns to form a double-sided loop structure or a single-sided loop structure, and the pile layer being fixed to one surface of the knit layer and being prepared by interlacing the pile yarns with the ground yarn loops of the knit layer.

Figure 1B:
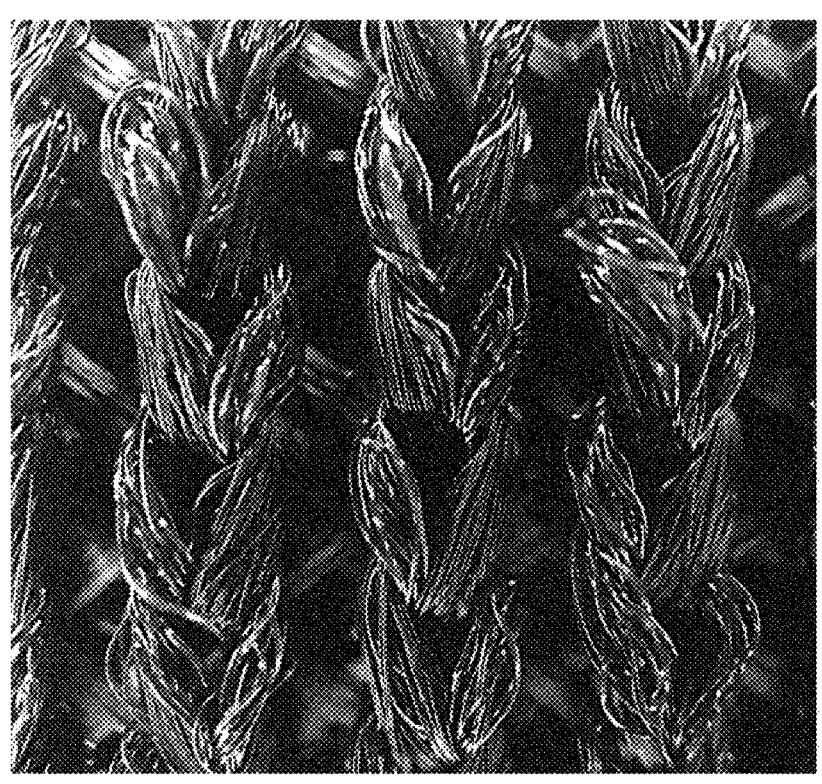
FIG. 1B is a photograph of the knit layer in accordance with various aspects of the present invention, in which the ground yarns are woven to the double-sided loop structure.

FIG. 1A is a view exemplarily illustrating a knit layer in accordance with various aspects of the present invention, in which ground yarns are woven to form a double-sided loop structure. Furthermore, FIG. 1B is a photograph of the knit layer in accordance with various aspects of the present invention, in which the ground yarns are woven to form the double-sided loop structure. When the ground yarns are woven to form the double-sided loop structure, the knit layer may be firmly woven, the pile yarns may be firmly fixed to loops of the ground yarns, and soft tactility of the surface of the pile knit fabric may be realized.

The loop shape may be circular or elliptical, and may be a polygon such as a square, a rectangle, a pentagon, or a hexagon.

Figure 2A:
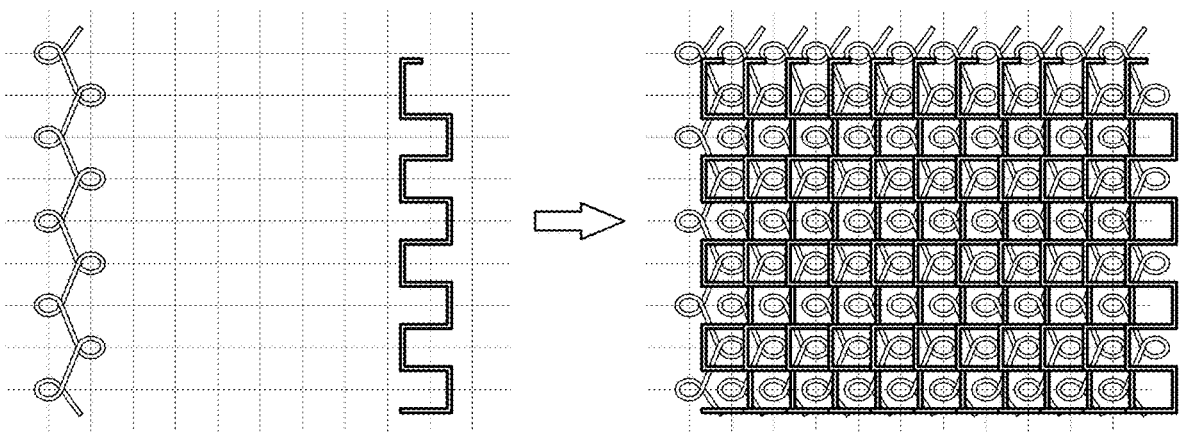
FIG. 2A is a view exemplarily illustrating a knit layer in accordance with various aspects of the present invention, in which ground yarns are woven to form a single-sided loop structure.
Figure 2B:
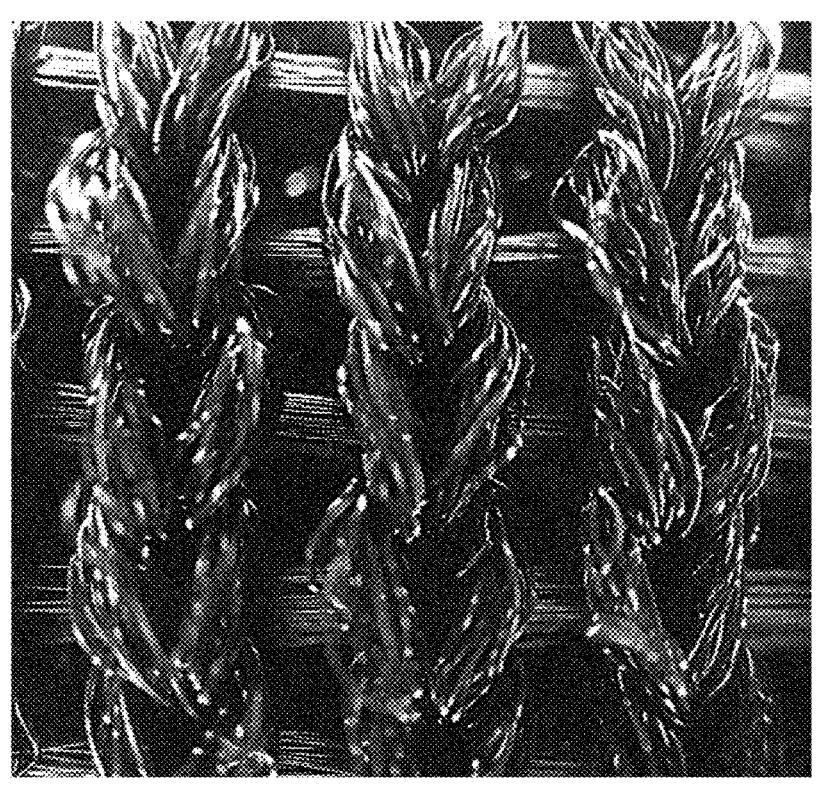
FIG. 2B is a photograph of the knit layer in accordance with various aspects of the present invention, in which the ground yarns are woven to form the single-sided loop structure.

FIG. 2A is a view exemplarily illustrating a knit layer in accordance with various aspects of the present invention, in which ground yarns are woven to form a single-sided loop structure. Furthermore, FIG. 2B is a photograph of the knit layer in accordance with various aspects of the present invention in which the ground yarns are woven to form the single-sided loop structure. When the ground yarns are woven to form the single-sided loop structure, elongation of the knit layer may be enhanced and simultaneously an excellent feeling of cushion of the pile knit fabric may be secured.

The ground yarns or the pile yarns are yarns to weave fabrics. The ground yarns mean yarns forming a woven bottom surface of the pile knit fabric. The pile yarns mean soft yarns covering the surface of the woven knit layer.

Figure 3A:
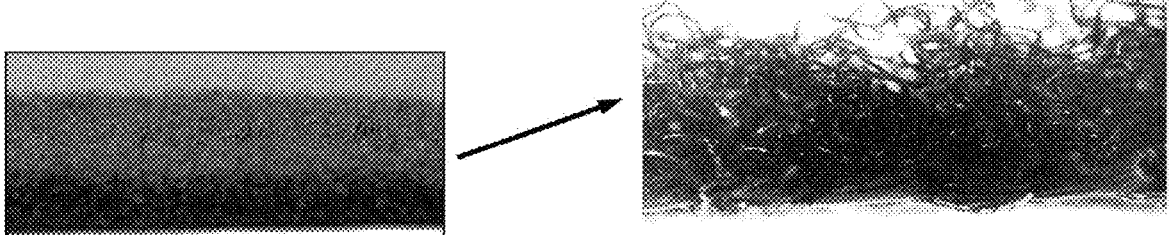
FIG. 3A and FIG. 3B are photographs showing cross-sections of a pile knit fabric in accordance with various aspects of the present invention.
Figure 3B:
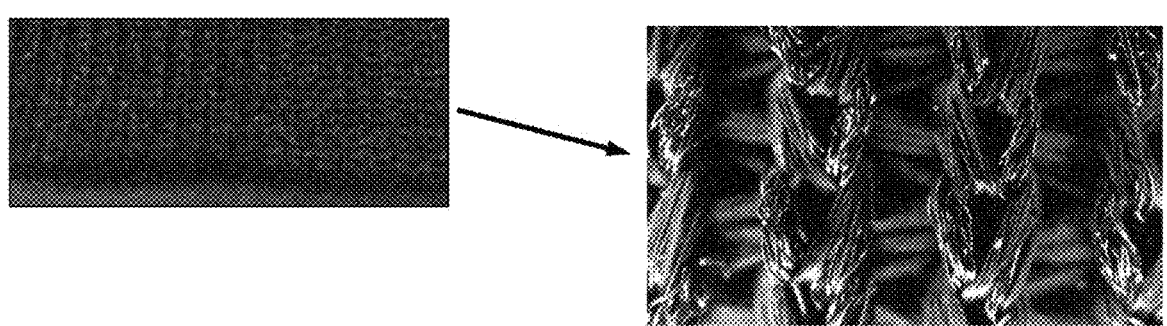

FIG. 3A and FIG. 3B are photographs showing cross-sections of the pile knit fabric in accordance with various aspects of the present invention. FIG. 3A shows the pile layer prepared by interweaving the pile yarns with the loops of the ground yarns, and FIG. 3B shows the knit layer prepared by weaving a plurality of ground yarns. Therethrough, it may be understood that the knit layer and the pile layer are woven tightly and physical coupling force therebetween is excellent.

The ground yarns or the pile yarns may be formed of one or more selected from the group consisting of polyamide, polypropylene, polyethylene terephthalate (PET), wool and combination thereof.

The number of the ground yarn loops of the knit layer is 250-950 per meter in the horizontal direction thereof. Here, when the number of the ground yarn loops is less than 250 per meter, an interval between the pile yarns of the pile layer is excessively broad and, thus, a fabric structure is not properly formed. On the other hand, when the number of ground yarn loops exceeds 950 per meter, the interval between the pile yarns of the pile layer is excessively narrow and weaving is impossible.

The knit layer is formed of the ground yarns, and fineness of the ground yarns may be 50-200 denier (D). When the fineness of the ground yarns is less than 50 denier, the ground yarns are weak and thus strength of the manufactured pile knit fabric may be lowered. On the other hand, when the fineness of the ground yarns exceeds 200 denier, production cost is raised and the ground yarns are thicker than an interval between needles of the manufacturing machine and thus the pile knit fabric may not be properly manufactured. The fineness of the ground yarns may be 100-150 denier.

The knit layer may have a thickness of 0.1-2 mm and a weight per area of 40-200 $g/m^2$. When the thickness of the knit layer is less than 0.1 mm, the knit layer is too weak and thus rigidity of the pile knit fabric may be lowered and, when the thickness of the knit layer exceeds 2 mm, production cost is raised and a fabric structure is too hardened and thus the pile knit fabric maybe unfavorable for forming a product. Furthermore, when the weight per area of the knit layer is less than 40 $g/m^2$, the pile knit fabric is woven loosely and thus rigidity of the pile knit fabric may be lowered. On the other hand, when the weight per area of the knit layer exceeds 200 $g/m^2$, the pile knit fabric is woven tightly and thus rigidity of the pile knit fabric may be enhanced, but production cost is raised, the weight of the pile knit fabric is increased, elongation of the pile knit fabric is lowered due to hardening of the fabric structure and thus the pile knit fabric may be unfavorable for forming a product. The weight per area of the knit layer may be 70-100 $g/m^2$.

One strand of the pile yarns includes 10-140 strands of filaments, and the filaments may have fineness of 3-25 denier. Here, when the number of the strands of the filaments included in one strand of the pile yarns is less than 10, the surface of the pile knit fabric is tough and thus soft tactility of the pile knit fabric may not be achieved. On the other hand, when the number of the strands of the filaments included in one strand of the pile yarns exceeds 140, the fineness of the pile yarns is excessively low and thus abrasion resistance of the surface of the pile knit fabric may be lowered. Particularly, one strand of the pile yarns may include 10-50 strands of the filaments. More particularly, one strand of the pile yarns may include 10-30 strands of the filaments.

Furthermore, when the fineness of the filaments is less than 3 denier, the fineness of the pile yarns is excessively low and thus abrasion resistance of the surface of the pile knit fabric may be lowered. On the other hand, when the fineness of the filaments exceeds 25 denier, the surface of the pile knit fabric is tough and thus soft tactility may not be achieved. The fineness of the filaments may be particularly 5-17 denier and more particularly 7-10 denier.

To implement an excellent feeling of cushion and soft tactility of the pile layer, the pile yarns may have a length of 2-10 mm. When the length of the pile yarns is less than 2 mm, the pile yarns are too short, the surface of the pile layer is tough and thus tactility may be lowered. On the other hand, when the length of the pile yarns exceeds 10 mm, abrasion resistance is low, a touch imprint may occur and increase in the weight of the pile knit fabric may be caused. The length of the pile yarns may be 3-5 mm.

The pile layer may have a thickness of 1-9 mm and a weight per area of 100-600 $g/m^2$. When the thickness of the pile layer is less than 1 mm, the pile knit fabric may not exhibit an excellent feeling of cushion and, when the thickness of the pile layer exceeds 9 mm, the weight of the pile knit fabric is increased and thus the total weight of a part manufactured using the pile knit fabric may be increased and production cost may be excessively raised. Furthermore, when the weight per area of the pile layer is less than 100 $g/m^2$, a feeling of cushion of the pile knit fabric may not be implemented and abrasion resistance of the pile knit fabric may be lowered. On the other hand, when the weight per area of the pile layer exceeds 600 $g/m^2$, fuel efficiency may be lowered due to increase in the total weight of the part and production cost may be excessively raised.

The pile knit fabric may have a weight per area of 200-700 $g/m^2$. When the weight per area of the pile knit fabric is less than 200 $g/m^2$, a fabric surface layer is not sufficiently formed and thus abrasion resistance of the surface of the pile knit fabric may be lowered. On the other hand, when the weight per area of the pile knit fabric exceeds 700 $g/m^2$, production cost may be raised and fuel efficiency may be lowered due to increase in the total weight of the part. The weight per area of the pile knit fabric may be particularly 260-370 $g/m^2$ and more particularly 320-360 $g/m^2$.

Furthermore, various aspects of the present invention are directed to providing a method of manufacturing a pile knit fabric for internal materials of vehicles, including preparing a plurality of ground yarns and a plurality of pile yarns, weaving the ground yarns into loop shapes to intersect each other lengthwise and widthwise, producing a double woven fabric using a double Raschel method by interweaving the pile yarns with ground yarn loops, producing pile knitted fabrics by cutting the pile yarns of the double woven fabric, brushing the cut pile yarns of the pile knitted fabrics, and performing heat treatment of the brushed pile knitted fabrics.

In preparing the ground yarns and the pile yarns, yarns to manufacture the pile knit fabric may be prepared. The ground yarns or the pile yarns may be formed of one or more selected from the group consisting of polyamide, polypropylene, polyethylene terephthalate (PET), wool and combination thereof.

In weaving the ground yarns, the ground yarns may be woven to form the double-sided loop structure, as exemplarily shown in FIG. 1A and FIG. 1B. Furthermore, the ground yarns may be woven to form the single-sided loop structure, as exemplarily shown in FIG. 2A and FIG. 2B.

In producing the double woven fabric, the double woven fabric, in which the pile yarns are connected between two knit layers prepared by weaving the ground yarns using the double Raschel method, may be produced. Here, the pile yarns may vertically reciprocate and thus be interwoven with the respective loops of the ground yarns.

In producing the pile knitted fabrics, the pile yarns of the double woven fabric may be cut to have a length of 2-10 mm. In producing the pile knitted fabrics, the pile yarns may be cut to have the length of 2-10 mm in consideration of a feeling of cushion and tactility of the pile knitted fabrics. That is, when the length of the pile yarns is 2-10 mm, the pile knit fabric may have an excellent feeling of cushion and soft tactility while maintaining required rigidity.

Furthermore, in producing the pile knitted fabrics, two pile knitted fabrics may be simultaneously produced by cutting the pile yarns located between both sides of the double woven fabric. Such a method may improve productivity by about 1.7 times or more, as compared to a conventional method of manufacturing a fabric just by weaving one side thereof.

In brushing the pile knitted fabrics, the cut pile knitted fabrics may be brushed by rotating a brush at a rate of 400-800 rpm and a speed of 4-10 m/min. In brushing the pile knitted fabrics, the cut pile yarns of the pile knitted fabrics are disposed with the brush so that fiber orientation is uniformized and, thus, tactility and a feeling of cushion of the pile yarns may be enhanced.

In performing heat treatment of the pile knitted fabrics, heat treatment may be performed at a temperature of 110-200° C. for 2-10 minutes. Here, when the temperature of heat treatment is lower than 110° C., uniformity in thermosetting of the surface of the pile layer is lowered and, thus, a deviation in appearance in the surface of the pile knit fabric may occur. On the other hand, when the temperature of heat treatment exceeds 200° C., some of the pile yarns of the pile layer are damaged by heat and thus tactility may be lowered.

Various aspects of the present invention are directed to providing a formed product for internal materials of vehicles using the pile knitted fabric. The formed product for internal materials of vehicles may be a luggage trim. The formed product for internal materials of vehicles may be manufactured by preheating a base material, stacking the preheated base material and the pile knit fabric within a cooling mold and then performing press forming. In the instant case, since only the base material is preheated and then the base material and the pile knit fabric are pressed, the pile yarns of the pile knit fabric are scarcely damaged during forming and, thus, the formed product for internal materials of vehicles may have excellent tactility and a fine appearance.

Furthermore, various aspects of the present invention are directed to providing a manufacturing machine 100 of a pile knit fabric 60 for internal materials of vehicles, including a weaving unit 10 configured to produce a double woven fabric 11 by weaving a plurality of ground yarns into loop shapes to intersect each other lengthwise and width wise and connecting ground yarn loops by pile yarns through vertical reciprocation, fabric transfer rollers 20, 30 and 70 configured to transfer the double woven fabric 11 produced by the weaving unit 10, a cutting unit 50 configured to produce pile knitted fabrics 60 by cutting the pile yarns of the double woven fabric 11 transferred from the fabric transfer rollers 20 and 30, brushing units 80 configured to brush the surfaces of the cut pile yarns of the pile knitted fabrics 60, and a heat treatment unit configured to perform heat treatment of the brushed pile knitted fabrics 60.

Figure 4:
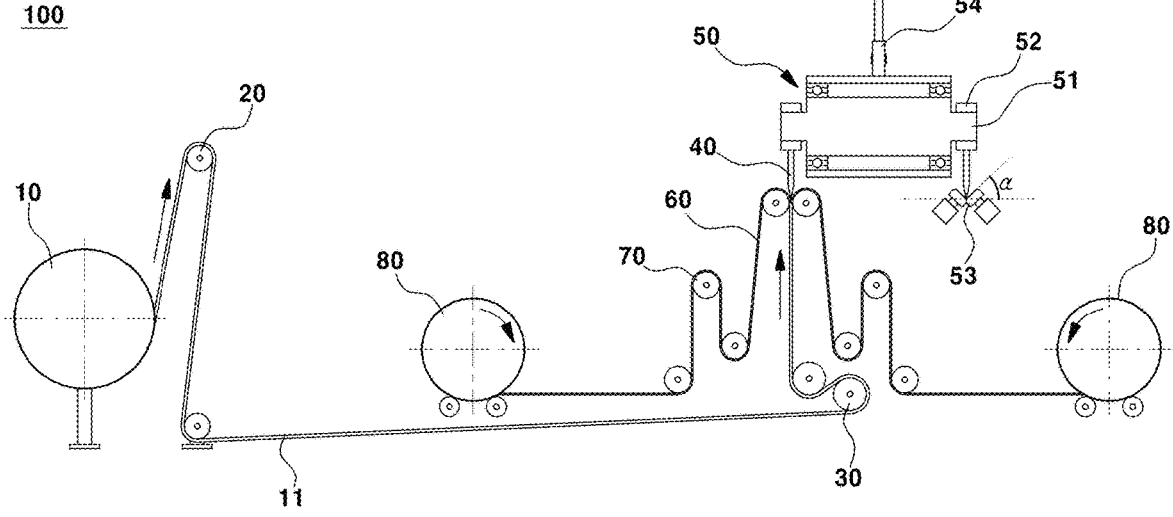
FIG. 4 is a structural view of a manufacturing machine of a pile knit fabric in accordance with various aspects of the present invention.

FIG. 4 is a structural view of the manufacturing machine 100 of the pile knit fabric 60 in accordance with various aspects of the present invention. Referring to FIG. 4, the double woven fabric 11 produced by the weaving unit 10 is transferred to the cutting unit 50 by the fabric transfer rollers 20 and 30. The cutting unit 50 cuts the double woven fabric 11 into the pile knitted fabrics 60 using a knife blade 40, and the pile knitted fabrics 60 are transferred by the fabric transfer rollers 70 located at both sides of the cutting unit 50. The pile knitted fabrics 60 are transferred to the brushing units 80 to brush the surfaces of the pile yarns.

The cutting unit 50 may include knife blades 40 configured to cut the double woven fabric 11, grinding stones 53 configured to grind the knife blades 40, driving pulleys 51 configured to position the knife blades 40, driving belts 52 configured to rotate the driving pulleys 51, and a fixing shaft 54 configured to fix the knife blades 40.

The lengths of the cut pile yarns may be adjusted by adjusting the position of the knife blade 40. That is, two pile knitted fabrics having the same length of the pile yarns or two pile knit fabric having different lengths of the pile yarns may be manufactured. Furthermore, a process of grinding the knife blade 40 may be performed after or simultaneously with cutting of the double woven fabric 11. Here, grinding means grinding of the tip portion of the knife blade 40 to uniformly cut fabrics for a long time.

The grinding stones 53 is configured to grind the knife blade 40 which is dulled by cutting fabrics through continuous processing. Here, the grinding stones 53 may grind the knife blade 40 at a grinding angle of 45-55°. The grinding angle may be adjusted according to the fineness of the filaments of the pile yarns. The grinding angle is an angle α which is measured from a horizontal line under the grinding stones 53 and may be suitable to cutting of the filaments having fineness of 3-25 denier. When the grinding angle of the knife blade 40 is less than 45°, grinding of the knife blade 40 is insufficient and, thus, the surface of the pile layer of the pile knit fabric become irregular and a defect may occur. In contrast, when the grinding angle of the knife blade 40 exceeds 55°, the knife blade 40 is excessively ground and thus abrasion of the knife blade 40 may occur. Furthermore, the knife blade 40 is frequently replaced due to excessive grinding, and thus, productivity may be lowered and there may be a strong possibility that poor quality is caused. The grinding angle may be adjusted by controlling two grinding stones 51 to contact each other at right angles at a grinding position of the knife blade 40. In the cutting unit 50, as the knife blade 40 is rotated by the driving pulley 51 and the driving belt 52, a quality level of the pile knitted fabrics 60 may be determined according to the feed speed of the double woven fabric 11 and the grinding angle of the knife blade 40.

In an exemplary embodiment of the present invention, the knife blade 40 is provided in plural and each of plurality of knife blades 40 are selectively engaged to the grinding stones 53.

The brushing unit 80 may include a cylinder and a brush coupled to the cylinder. The brushing unit 80 may brush the surfaces of the pile yarns of the pile knit fabric 60, produced by the cutting unit 50, with the brush to uniformly arrange the pile yarns.

A conventional fabric manufacturing machine has a weaving speed of about 15 m per hour, but the manufacturing machine 100 in accordance with various aspects of the present invention may weave about 90 m of the pile knit fabric 60 per hour. Furthermore, in the conventional fabric manufacturing machine, it takes 67 hours to manufacture about 1,000 m of the pile knit fabric 60. On the other hand, the manufacturing machine 100 in accordance with various aspects of the present invention may weave the double woven fabric 11 for 39 hours and perform cutting of the double woven fabric 11 into the pile knitted fabrics 60 for 6 hours and, thus, require total 45 hours. Therefore, the manufacturing machine 100 in accordance with various aspects of the present invention may enhance productivity by about 1.7 times, as compared to the conventional method of manufacturing a fabric just by weaving one side thereof.

Hereinafter, the present invention will be described in more detail through the following examples. The following examples are only for enhancement of understanding of the present invention and are not intended to limit the scope of the present invention.

Example 1

As stated in Table 1 below, PET yarns having fineness of 100 D were prepared as ground yarns, 10-20 strands of filaments were used to prepare one strand of pile yarns, and loops of the ground yarns by a knit method. Thereafter, the double woven fabric was move to the cutting unit by the fabric transfer rollers. Thereafter, the double woven fabric was divided into pile knitted fabrics by cutting the centers of the pile yarns of the double woven fabric using the knife blade of the cutting unit. The grinding angle of the grinding stones to grind the knife blade was adjusted to 50°. The knit layer of the pile knit fabric had a thickness of 1 mm and a weight per area of 100 g/m$^2$, and the pile layer has a thickness of 3 mm and a weight per area of 150 g/m$^2$.

The cut pile yarns of the pile knit fabric were brushed with the brush. Here, the brush was rotated at a rate of 600 rpm and a speed of 6 m/min. Thereafter, the brushed pile knit fabric was heat-treated at a temperature of 170° C. for 4 minutes.

Examples 2-5

Pile knitted fabrics were manufactured using the same method as in example 1, but the details of pile yarns and ground yarns of the pile knitted fabrics of examples 2-5 were changed as stated in Table 1.

Comparative Example 1

A non-woven fabric woven from PET yarns having fineness of 10 D was prepared.

Comparative Example 2

A bulked continuous filament (BCF) fabric woven from PA6 yarns having fineness of 10 D planted in a PET base fabric was prepared.

Comparative Example 3

A bulked continuous filament (BCF) fabric woven from PET yarns having fineness of 10 D planted in a PET base fabric was prepared.

TABLE 1

| | | Pile layer (pile yarn) | | | Knit layer (ground yarn) | | |
|---|---|---|---|---|---|---|---|
| Classification | Component | Filament fineness (D) | Weight per area (g/m$^2$) | Length of pile yarn (mm) | Component | Fineness (D) | Weight per area (g/m$^2$) |
| Example 1 | PET | 10 | 150 | 2 | PET | 100 | 100 |
| Example 2 | PET | 7 | 250 | 3 | PET | 100 | 100 |
| Example 3 | PET | 10 | 250 | 3 | PET | 100 | 100 |
| Example 4 | PET | 10 | 270 | 5 | PET | 100 | 110 |
| Example 5 | PA6 | 10 | 250 | 3 | PET | 100 | 100 |
| Comparative example 1 | PET non-woven fabric | 10 | 450 | 3 | | | |
| Comparative example 2 | PA6 | 10 | 300 | 5 | PET base fabric | | 100 |
| Comparative example 3 | PET | 10 | 300 | 5 | PET base fabric | | 100 |

PET yarns having fineness of 10D were used as the filaments. The PET ground yarns were fed to the weaving unit of the manufacturing machine and were woven to intersect each other lengthwise and widthwise into loop shapes. Thereafter, a double woven fabric, both sides of which were woven, was produced by vertically reciprocating the PET pile yarns at intervals of 4 mm to be interwoven with the

Test Example 1

To evaluate properties of the manufactured fabrics of examples 1-5 and comparative examples 1-3, the properties of the respective fabrics were measured using the following methods. Results of evaluation will be stated and shown in Table 2 and FIG. 5A and FIG. 5B.

Evaluation Methods

Evaluation of Basic Properties of Fabrics

Weight per area: Three specimens of each of the fabrics, having a width 250 mm and a length 250 mm, were prepared, weights of the specimens were measured to +0.01 g, and an average of the three measured weights was determined and stated as a weight per area (unit: $g/m^2$).

Tensile strength: Specimens of the fabrics, having a width of 50 mm and a length of 250 mm, were pulled at a speed of 200 m/min using a universal testing machine (UTM) and thus maximum loads were measured.

Elongation: Specimens of the fabrics, having a width of 50 mm and a length of 250 mm, were pulled at a speed of 200 m/min using the UTM and thus elongations when the specimens fractured were measured.

Emotional Quality Evaluation

Abrasion: After the fabrics underwent an abrasion test using an abrasion tester from TABER industries, in which the number of rotations is set to 100, a load is set to 1 kg and an H-18 abrasion wheel is used, states of the fabrics were determined as the below grades.

Grade 1: Cut and wear of a pile layer are severe and a worn surface is severely hollowed out.

Grade 2: Cut and wear of a pile layer and pulling-up of pile yarns are clearly visible.

Grade 3: Cut and wear of a pile layer slightly occur but are invisible.

Grade 4: Cut of a pile layer slightly occurs.

Grade 5: No wear of a pile layer is confirmed.

Tactility: The textures of the fabrics felt by hand are classified into reference values (5: favorable↔1: unfavorable, favorable meaning soft and unfavorable meaning tough).

duction cost but has a heavy weight per area and low tensile strength. Due to the low tensile strength, needle-punched marks at a bent portion were exposed after forming a product and, thus, quality of the product was lowered. Furthermore, the fabric of comparative example 1 exhibits poor properties, i.e., low elongation, a low abrasion grade and poor tactility.

Furthermore, it was confirmed that the fabrics of comparative examples 2 and 3 have heavy weights per area due to use of the base fabric and are thus difficult to exhibit a lightweight effect, and they exhibit high tensile strengths but the tensile strengths thereof are lower than the tensile strengths of the fabrics of examples 1-5. Furthermore, it was confirmed that the fabrics of comparative examples 2 and 3 have the highest production costs.

Figure 5A:
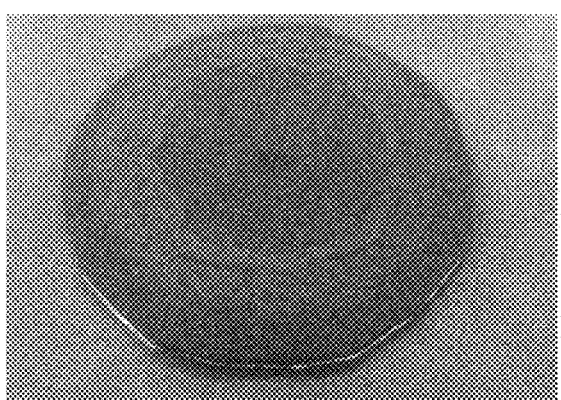
FIG. 5A and FIG. 5B are photographs showing abrasion test results of fabrics manufactured in comparative example 1 and example 2 in accordance with various aspects of the present invention.
Figure 5B:
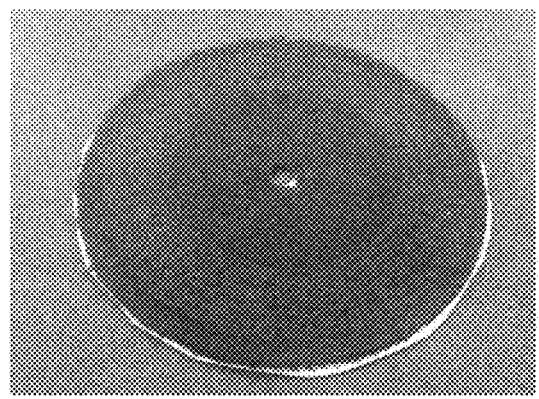

FIG. 5A and FIG. 5B are photographs showing abrasion test results of the fabrics manufactured in comparative example 1 and example 2. FIG. 5A shows that the fabric of comparative example 1 generated a lot of lint and cut of the pile yarns after the abrasion test. In contrast, FIG. 5B shows that the fabric of example 2 did not generate lint or cut of the pile yarns after the abrasion test but maintained a soft surface texture.

Test Example 2: Evaluation of Properties of Formed Products According Fabric Types Luggage trims were manufactured using the fabrics of example 2 and comparative examples 1 and 2. Appearances and contamination degrees of the manufactured luggage trims were evaluated, and results of such evaluation will be stated and shown in FIG. 6 and FIGS. 7A to 11C.

TABLE 2

| Classification | Composition | | Length of pile yarn (mm) | Properties | | | | | |
| | Pile yarn | Ground yarn | | Weight per area ($g/m^2$) | Tensile strength (N/50 mm) | Elongation (%) | Abrasion (grade) | tactility | Production cost |
|---|---|---|---|---|---|---|---|---|---|
| Example 1 | PET | PET | 2 | 250 | 385 | 80 | 3 | 4 | 1 |
| Example 2 | PET | PET | 3 | 350 | 400 | 80 | 3 | 5 | 1.1 |
| Example 3 | PET | PET | 3 | 350 | 400 | 80 | 3 | 4-5 | 1.15 |
| Example 4 | PET | PET | 5 | 380 | 440 | 80 | 3 | 5 | 1.4 |
| Example 5 | PA6 | PET | 3 | 350 | 400 | 80 | 3 | 4 | 1.3 |
| Comparative example 1 | PET (non-woven fabric) | | 3 | 450 | 300 | 60 | 2 | 2 | 1 |
| Comparative example 2 | PA6 (base fabric: PET) | | 5 | 400 | 380 | 40 | 3-4 | 3 | 2 |
| Comparative example 3 | PET (base fabric: PET) | | 5 | 400 | 380 | 30 | 3 | 3 | 1.6 |

The results of Table 2 show that the fabrics of examples 1 to 5 have lower weights per area than the fabrics of comparative examples 1 to 3 but have higher tensile strengths than the fabrics of comparative examples 1 to 3. Furthermore, it was confirmed that the fabrics of examples 1 to 5 not only have exhibit elongation of 80% but also exhibit enhanced abrasion grades and tactility. However, it was confirmed that, if the length of the pile yarns is long or PA6 yarns and PET yarns are mixed as in the fabrics of examples 4 and 5, production cost is slightly increased but such an increase is lower than that of the fabric of comparative example 2.

In contrast, it was confirmed that the conventional PET non-woven fabric of comparative example 1 has low pro- Evaluation Method Appearance and contamination degree: After 20 g of sand was sprinkled over the fabrics (200×200 mm) and then the fabrics are put into the mold to manufacture luggage trims, the manufactured luggage trims were cleaned by reciprocating a portable handheld cleaner for vehicles one time and then sand remaining amounts on the formed products were verified with the naked eye. Results of evaluation are represented by several marks (⊚: very good, ○: good, Δ: bad, and x: very bad).

The results of FIG. 6 show that a bent portion of the luggage trim manufactured using the fabric of example 2 is not exposed and thus the appearance of the luggage trim is very good, and the luggage trim exhibits soft tactility. Furthermore, it was confirmed that, in the contamination test, contaminants are easily removed from the luggage trim, and the fabric has a lighter weight of 350 g/m² than those of the fabrics of comparative examples 1 and 2.

In contrast, it was confirmed that the luggage trim manufactured using the fabric of comparative example 1 has a low density at a bent portion and thus the appearance of the luggage trim is bad, and the luggage trim exhibits low or poor values of properties, i.e., poor tactility, a low contamination degree and a heavy weight per area.

Furthermore, it was confirmed that a weaving pattern at some parts of the luggage trim manufactured using the fabric of comparative example 2 is externally exposed and thus the appearance of the luggage trim is not very good, and the luggage trim exhibits low or poor values of properties, i.e., poor tactility, a low contamination degree and a heavy weight per area, as compared to the luggage trim manufactured using the fabric of example 2.

Figure 7A:
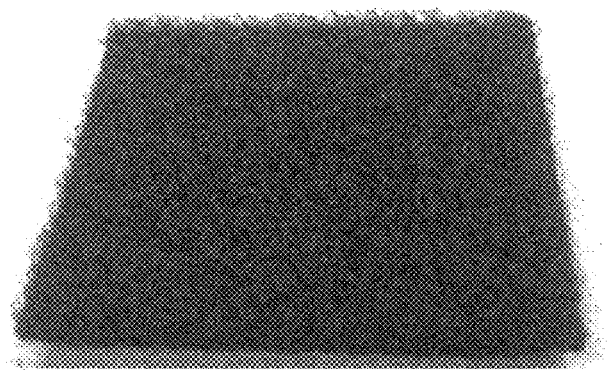
FIG. 7A, FIG. 7B and FIG. 7C are photographs showing manufactured fabrics of comparative examples 1 and 2 and example 2 in accordance with various aspects of the present invention.
Figure 7B:
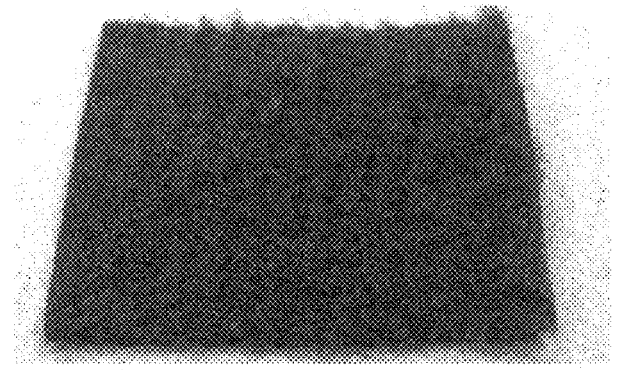
Figure 7C:
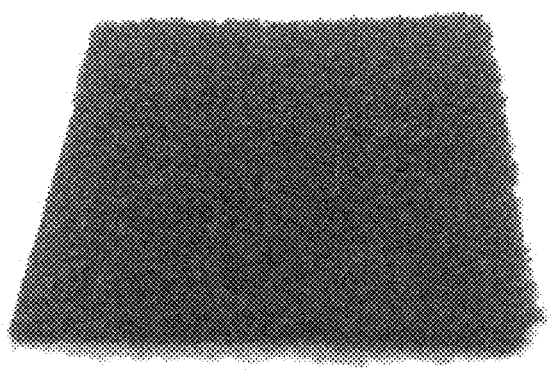

FIG. 7A, FIG. 7B and FIG. 7C are photographs showing the manufactured fabrics of comparative examples 1 and 2 and example 2. FIG. 7A, FIG. 7B and FIG. 7C show that the pile yarns of the pile knit fabric of example 2 are more densely disposed than the yarns of the fabrics of comparative examples 1 and 2.

Figure 8A:
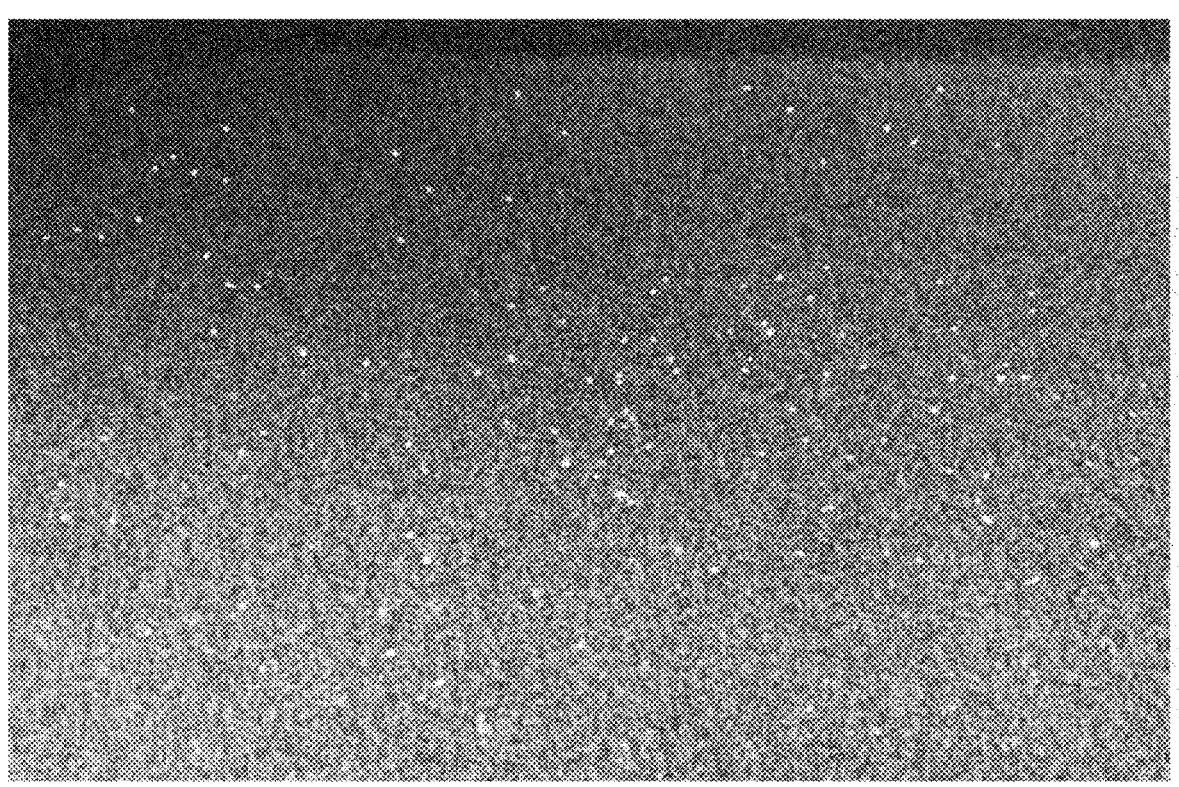
FIG. 8A and FIG. 8B are photographs showing evaluation of a degree of contamination of the manufactured fabric of comparative example 1 in accordance with various aspects of the present invention.
Figure 8B:
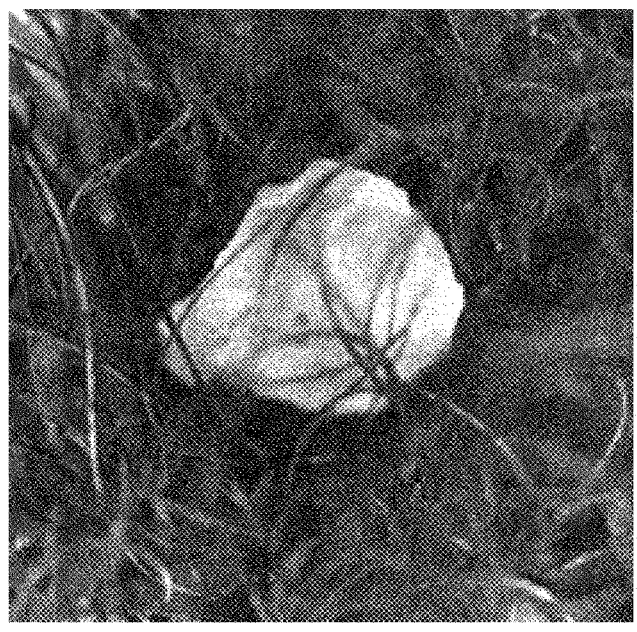

FIG. 8A and FIG. 8B are photographs showing evaluation of a degree of contamination of the manufactured fabric in comparative example 1. FIG. 8A and FIG. 8B show that foreign substances, such as sand, enter spaces between irregular pile yarns on the surface of the low-density non-woven fabric and thus it is difficult to remove the foreign substances.

Figure 9A:
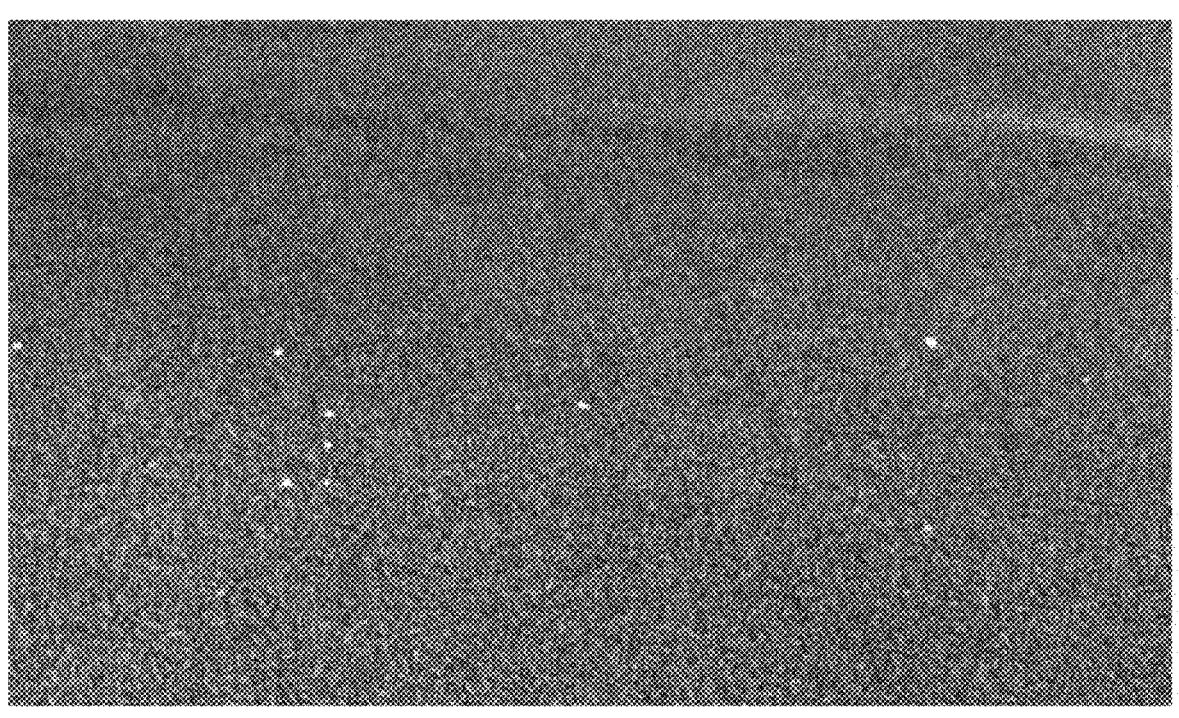
FIG. 9A and FIG. 9B are photographs showing evaluation of a degree of contamination of the manufactured fabric of example 2 in accordance with various aspects of the present invention.
Figure 9B:
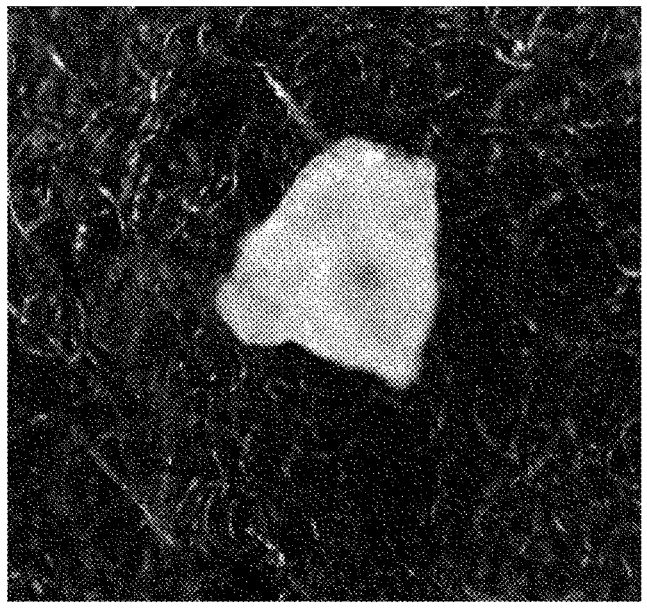

FIG. 9A and FIG. 9B are photographs showing evaluation of a degree of contamination of the manufactured fabric in example 2. FIG. 9A and FIG. 9B show that the pile knit fabric of example 2 is woven at a relatively high density, as compared to the fabric of comparative example 1, and thus foreign substances, such as sand, remain only on the surface of the pile yarns and are easily removed.

Figure 10A:
FIG. 10A and FIG. 10B are photographs showing the manufactured fabrics of comparative example 2 and example 2 in accordance with various aspects of the present invention.
Figure 10B:
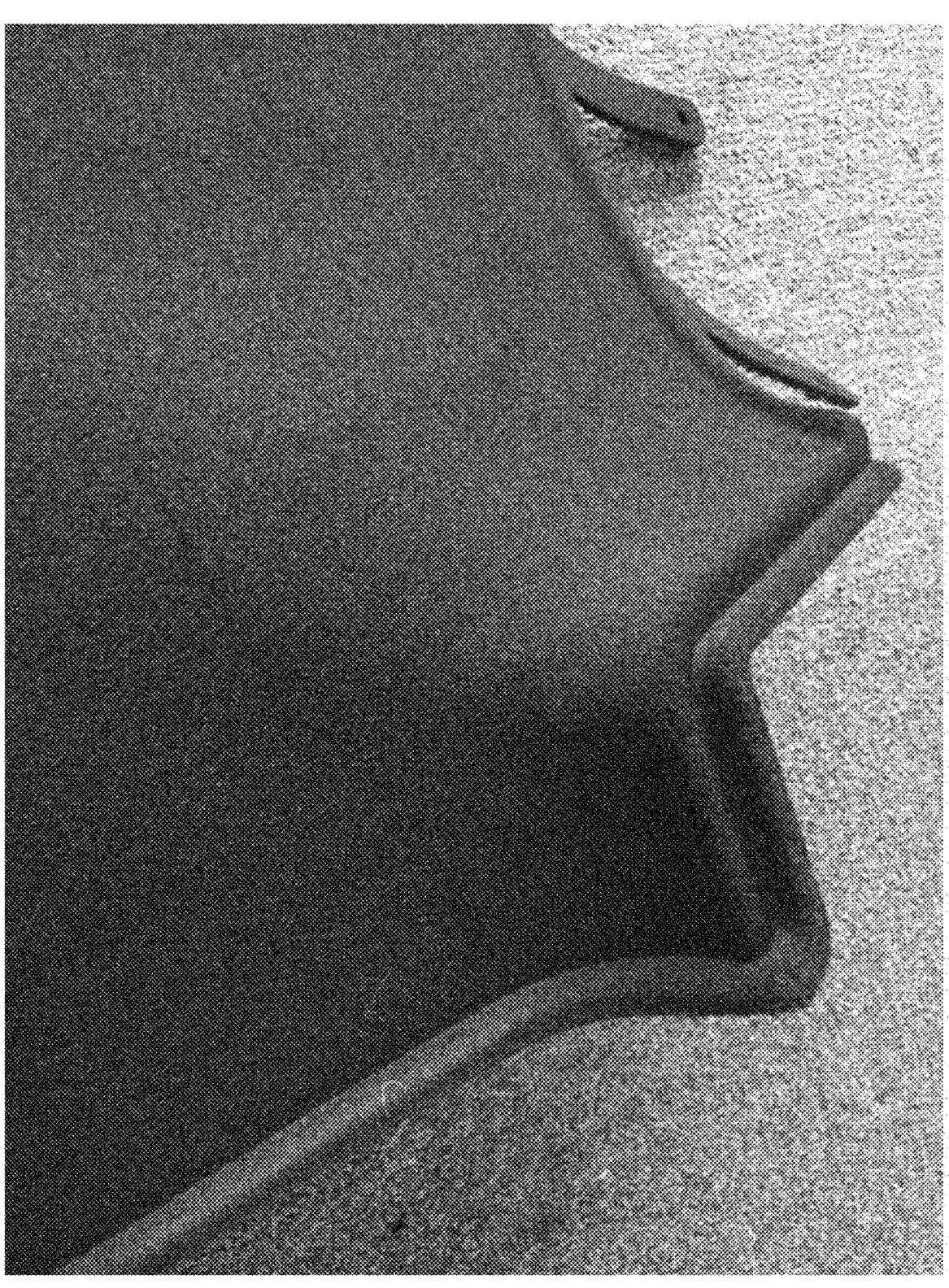

FIG. 10A and FIG. 10B are photographs showing the manufactured fabric of comparative example 2 and the manufactured fabric of example 2, respectively. FIG. 9A and FIG. 9B show that the pile knit fabric of example 2 has soft tactility and luxurious appearance, as compared to the fabric of comparative example 2.

Figure 11A:
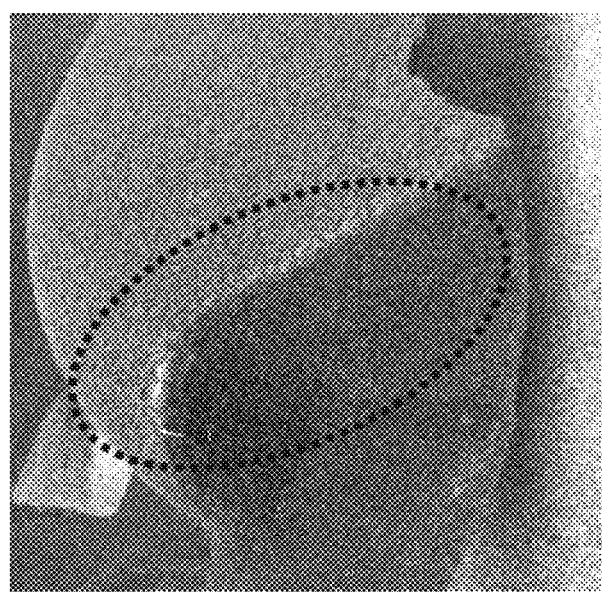
FIG. 11A, FIG. 11B and FIG. 11C are photographs showing luggage trims formed using the manufactured fabrics of comparative examples 1 and 2 and example 2 in accordance with various aspects of the present invention.
Figure 11B:
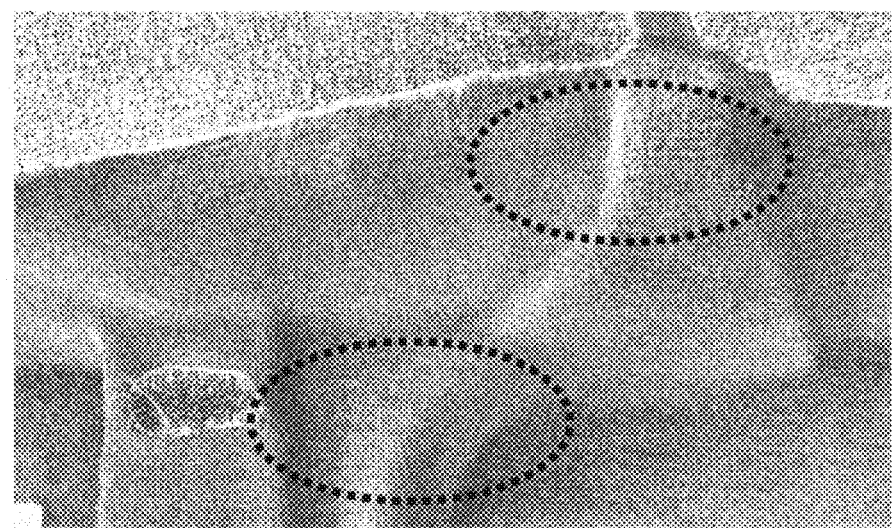
Figure 11C:
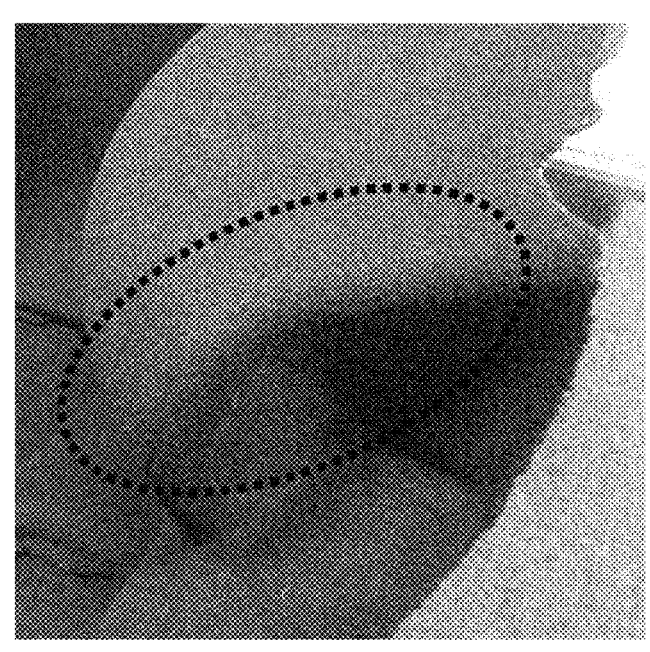

FIG. 11A, FIG. 11B and FIG. 11C are photographs showing luggage trims formed using the manufactured fabrics of comparative examples 1 and 2 and the pile knit fabric of example 2. FIG. 11A shows that, in the case of the luggage trim manufactured using the non-woven fabric of comparative example 1, the non-woven fabric is split at a bent portion and the base material is externally exposed therethrough, and thus quality of the luggage trim is lowered. Also, FIG. 11B shows that, in the case of the luggage trim manufactured using the fabric of comparative example 2, a weaving pattern on the base fabric is partially exposed and thus appearance of the luggage trim is poor.

In contrast, FIG. 11C shows that the luggage trim manufactured using the pile knit fabric of example 2 has good and luxurious appearance. Furthermore, it may be confirmed that the luggage trim manufactured using the pile knit fabric of example 2 has excellent surface tactility and enhanced emotional quality.

As is apparent from the above description, a pile knit fabric for internal materials of vehicles in accordance with various aspects of the present invention, which includes a knit layer prepared by weaving ground yarns and a pile layer prepared by interweaving pile yarns with ground yarn loops of the knit layer, has excellent physical coupling force between the ground yarns and the pile yarns and uniform fiber orientation of the pile yarns and may thus improve tactility.

In addition, the pile knit fabric in accordance with various aspects of the present invention has excellent abrasion resistance and scratch resistance and enhanced formability, thus facilitating realization of products of various shapes.

Furthermore, a method of manufacturing a pile knit fabric for internal materials of vehicles in accordance with various aspects of the present invention, in which the pile knit fabric is manufactured by producing a double woven fabric and then cutting the centers of pile yarns of the double woven fabric, improves productivity and omits separate latex treatment on the rear surface of the pile knit fabric which was conducted on a conventional BCF or non-woven fabric, thus shortening a manufacturing process.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A manufacturing machine of a pile knit fabric for internal materials of vehicle, the machine comprising:

a weaving unit configured to produce a double woven fabric by weaving a plurality of ground yarns into loop shapes to intersect each other lengthwise and widthwise and connecting ground yarn loops by a plurality of pile yarns through vertical reciprocation;

fabric transfer rollers engaged to the double woven fabric and configured to transfer the double woven fabric produced by the weaving unit;

a cutting unit configured to produce pile knitted fabrics by cutting the plurality of pile yarns of the double woven fabric transferred from the fabric transfer rollers;

brushing units receiving the cut pile yarns of the pile knitted fabrics and configured to brush surfaces of the cut pile yarns of the pile knitted fabrics; and a heat treatment unit configured to perform heat treatment of the brushed pile knitted fabrics, wherein each of the brushing units includes a cylinder and a brush coupled to the cylinder.

2. The manufacturing machine of claim 1, wherein the cutting unit includes:

at least a knife blade configured to cut the double woven fabric;

at least a grinding stone selectively engaged to the at least a knife blade to grind the at least a knife blade;

driving pulleys engaged to the at least a knife blade and configured to position the at least a knife blade;

driving belts coupled to the driving pulleys and configured to rotate the driving pulleys; and a fixing shaft fixed to the at least a knife blade.

3. The manufacturing machine of claim 2, wherein the at least a grinding stone is configured to grind the at least a knife blade at a grinding angle of 45-55°.

* * * * *